United States Patent [19]

Eckfeldt et al.

[11] Patent Number: 5,161,947
[45] Date of Patent: Nov. 10, 1992

[54] FAN CASE STRUT FOR TURBOMACHINE

[75] Inventors: Grant Eckfeldt, Colchester; Michael A. Weisse, Windsor Locks; Robert F. Kasprow, Wethersfield; Kurt M. Dembeck, Vernon; Herbert J. Lillibridge, Plainville, all of Conn.

[73] Assignee: United Technologies Corporation, Hartford, Conn.

[21] Appl. No.: 696,885

[22] Filed: May 8, 1991

[51] Int. Cl.$^5$ .............................................. F01D 25/28
[52] U.S. Cl. ................. 415/211.2; 415/208.2; 415/189; 415/142
[58] Field of Search ............ 415/142, 189, 191, 208.1, 415/208.2, 209.4, 210.1, 211.2, 213.1, 77; 60/39.31, 226.1; 248/159, 224.2, 554, 555

[56] References Cited

U.S. PATENT DOCUMENTS

| | | | |
|---|---|---|---|
| 2,599,654 | 6/1952 | Musikant et al. | 415/208.1 |
| 2,839,894 | 6/1958 | Shutts et al. | |
| 3,398,535 | 8/1968 | Campbell et al. | |
| 3,549,272 | 12/1970 | Bauger et al. | 60/226.1 |
| 4,744,214 | 5/1988 | Monsarrat et al. | |
| 4,785,625 | 11/1988 | Stryker et al. | |
| 4,820,117 | 4/1989 | Larrabee et al. | |

Primary Examiner—Edward K. Look
Assistant Examiner—James A. Larson

[57] ABSTRACT

An axial flow turbomachine's engine core (16) and radially outwardly disposed fan case (18) are joined together with a radially extending segmented fan case strut (10). The strut (10) is segmented into a radially inner portion (20) and a radially outer portion (20) at a midspanly disposed strut joint (14). The strut joint (14) has an axially extending tapered tongue (26) which slidably engages with a mating axially extending groove (46). A radially extending flange (36) disposed proximate to the trailing edge (35) of the inner portion (20) is bolted to the radially extending flange (56) disposed proximate to the trailing edge (55) of the outward portion (40) when the tongue (26) is fully engaged with the groove (46) to releasably secure the strut joint (14). Another embodiment shows a pair of interlocked axially extending channels (60) each having a U-shaped cross-section replacing the interlocked tongue and groove (26,46) of the first embodiment. Radially extending flanges (36,56) disposed proximate to the portions' (20,40) trailing edges 935,55) are likewise bolted together to releasably secure the strut joint (14) when the channels' three corresponding pairs of contact surfaces (62) are fully slidably engaged.

7 Claims, 3 Drawing Sheets

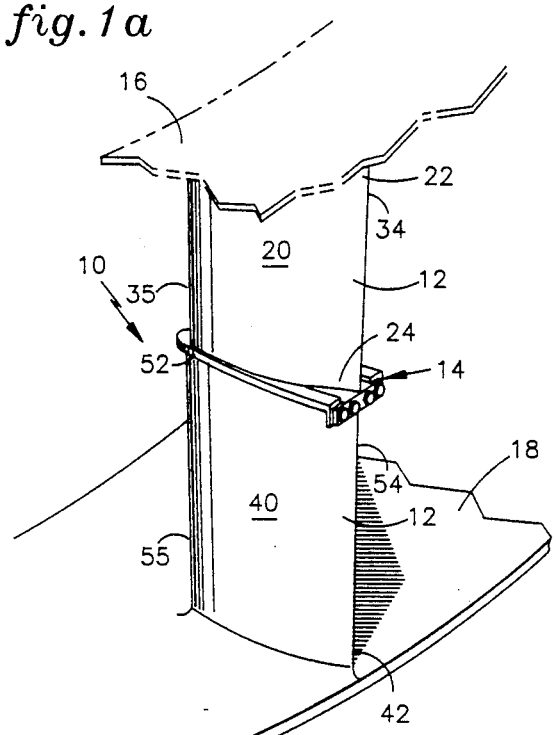
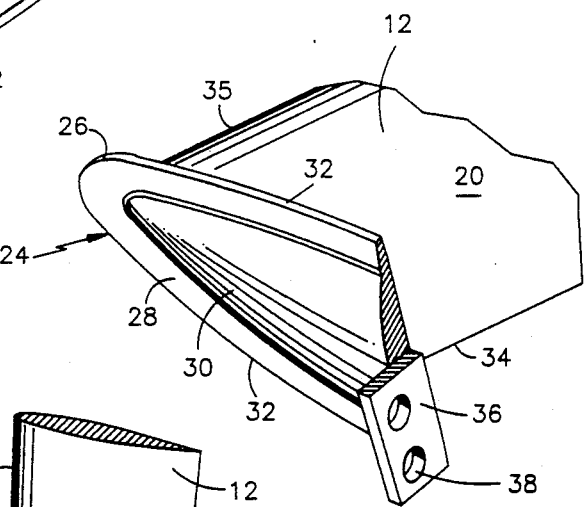
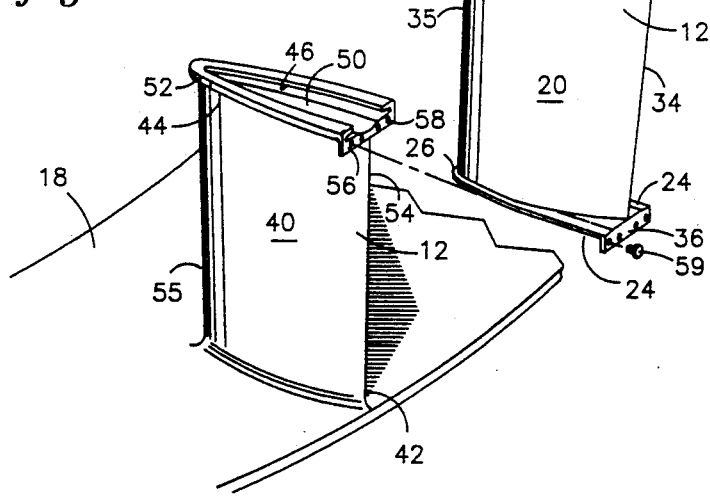

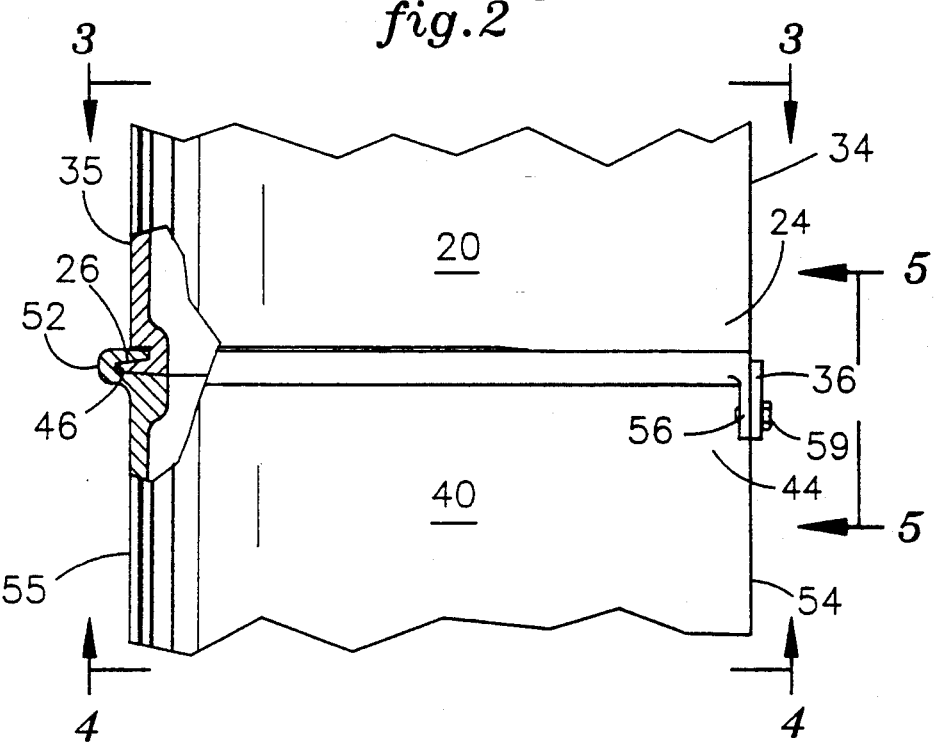
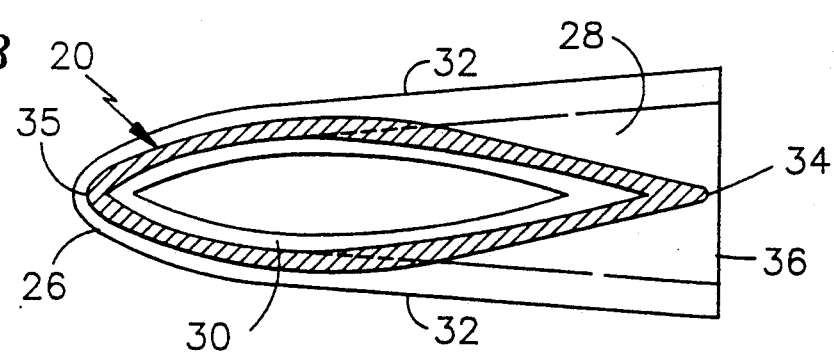
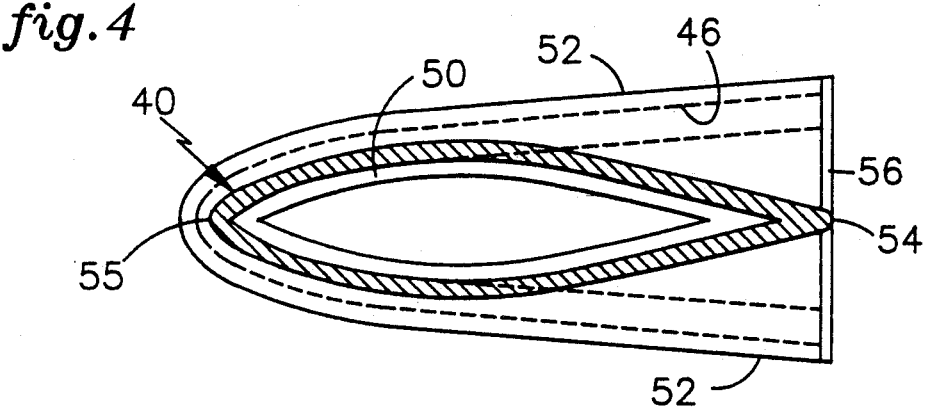

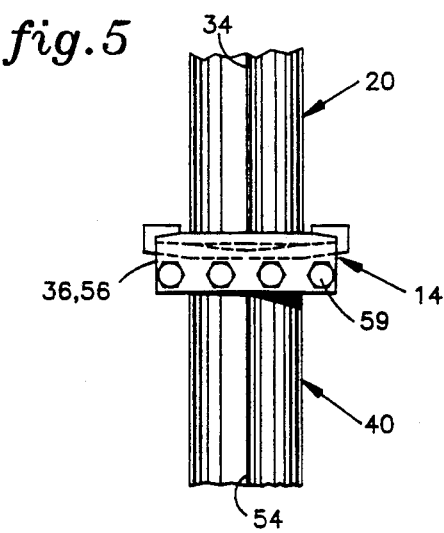
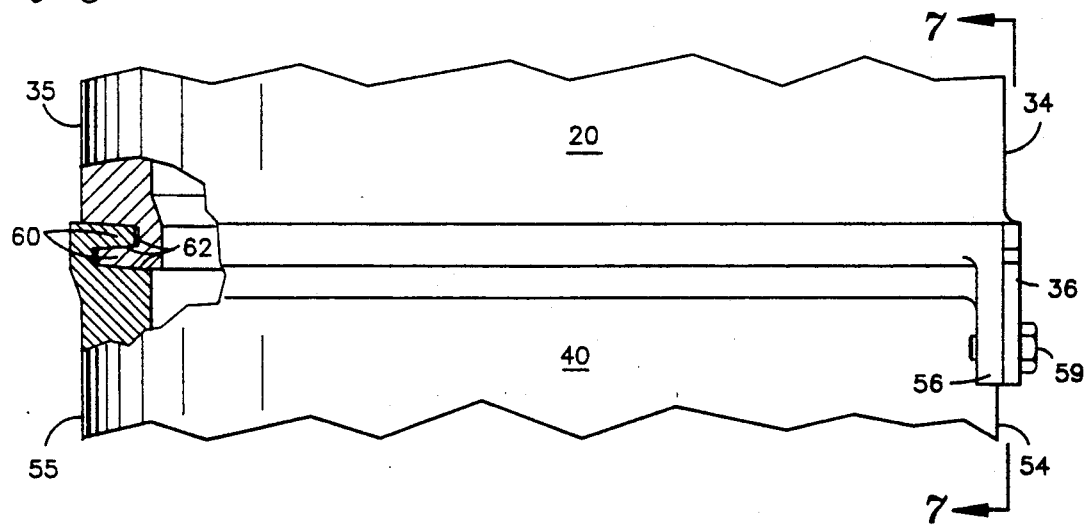
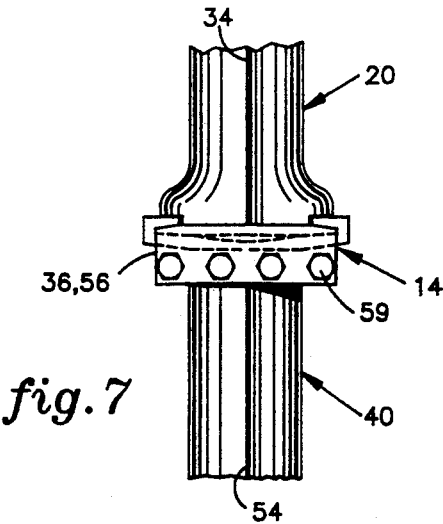

FAN CASE STRUT FOR TURBOMACHINE

TECHNICAL FIELD

This invention relates to turbomachines and more particularly to a structural connector for joining together an engine core and a fan case.

BACKGROUND ART

Axial flow turbomachines include an axially disposed engine core and a radially outwardly disposed engine case which surrounds the core. High bypass turbomachines also have a relatively large diameter fan case concentrically disposed radially outwardly of the engine core which shrouds one or more axially forward compressor fans. The radial distance between the core and the fan case varies with a particular engine configuration.

According to the prior art, a plurality of radially extending circumferentially arrayed fan case struts join together the fan case and engine core. These struts are configured to provide necessary structural support to the fan case which is subjected to a variety of structural and airflow induced axial, radial, and moment loads arising over a broad range of aircraft and engine operating conditions.

The fan case struts transmit these loads to the engine core. Various strut cross-sections may be used to provide necessary structural rigidity and strength. In addition, the fan case struts may have their exposed surfaces aerodynamically configured to provide shaped airflow benefits.

One such fan case strut, shown in U.S. Pat. No. 3,398,535, issued to Campbell, provides a mid-span annular structure concentrically disposed between the fan case and engine core which provides structural rigidity to the fan case strut-tied configuration. A plurality of radially extending circumferentially arranged fan case struts are structurally linked to this mid-span annulus. An additional plurality of V-struts further connect the mid-span annulus with the engine core at staggered intervals relative to the radially extending struts. The V-struts of this reference also include a pivotal connection on at least one strut end to avoid moment load transfer to the engine core.

Another fan case strut configuration, shown in U.S. Pat. No. 4,820,117, issued to Larrabee shows a one piece structural strut having an I beam shaped cross-section having lap-joined aerodynamic surfaces located at the strut's leading and trailing edges. These lap-joined aerodynamic contours provide only aerodynamic, not structural, benefits to this configuration.

SUMMARY OF THE INVENTION

The present invention provides a severable, segmented load-bearing strut for joining together the engine core and a radially outwardly disposed axial flow turbomachine's fan case at a plurality of circumferential locations.

The strut of the present invention, which releasably joins together the engine's core and fan case, is severable at a radially intermediate joint into radially inner and outer portions. This radially intermediate joint is designed to facilitate removal and replacement of the engine core from the fan case while meeting structural stiffness and load-bearing requirements.

More particularly, the joint comprises a laterally extending mating tongue and groove which are disposed on the radially outer end of the inward portion and on the radially inner end of the outward portion, respectively. The tongue, having a tapered profile, axially slidably engages with the groove at two slidably contact surfaces and having a corresponding profile which is peripherally disposed about the radially inner end of the outward portion.

As an aid to the alignment of the two mating portions during assembly, a shaped contour, such as an axially extending radially projecting ridge disposed on a lateral face of the tongue, slidably cooperates with a corresponding furrow disposed in the radially inner end of the outward portion. During initial assembly of the fan case about the engine core, the shaped contour is guided and centered within the furrow, along an axial length which is shorter than the overall engagement length by a distance equal to or greater than the tongue and groove's axial engagement length at the leading edge of the joint, thereby dividing the alignment and engagement functions of the present invention.

The tongue and groove, each having an axially downstream disposed trailing edge, each also have a radially extending flange disposed thereon. The flanges are substantially parallel to each other and are substantially perpendicular to a plane defined by the slidable connection of the tongue and groove. After the tongue has been fully engaged with the groove these corresponding flanges are releasably joined together with a bolted connection to secure the joint against relative sliding motion between the portions' corresponding ends. Due to their location and configuration, the flanges are not significant load-bearing members and any loading which the fan case is subjected to does not pass through the bolted flange connection. In addition to the above, the bolted connection may be pretensioned or preloaded to correct for any minute wear in the strut joint.

The radially extending flanges may be disposed on a radially contiguous common edge such as the leading edge or the trailing edge of the fan case strut, but preferably only on the latter surfaces for aerodynamic efficiencies.

According to the present invention, the strut portions further include a radially extending aerodynamically shaped planform. The radially intermediately disposed ends of each strut portion are substantially chordwisely oriented, causing the strut portions to mate at a common chord of the planform. The radially extending flanges of the portions of this configuration are disposed proximate to the trailing edges of the strut portions and are likewise releasably joined together to secure the joint against relative axial sliding motion.

In yet another embodiment, the single tongue and groove joint is instead comprised of two interlocked axially extending U-shaped channels, each channel having three slidable contact surfaces. Using a common tooling profile for the shaping of both channels, dimensional parameters such as contact surface length and width and notch depth ensure desired engagement characteristics. This shared geometry also offers precise control of additional geometric parameters, such as pinch and seating of the intermediate strut ends. An axially downstream/trailing edge flange/bolted connection secures the midspan joint against relative axial sliding motion as described above.

BRIEF DESCRIPTION OF THE DRAWINGS

FIG. 1a is an isometric view of the case strut of the present invention.

FIG. 1b is an exploded isometric view of the segmented fan case strut.

FIG. 1c is an isometric view of the radially outer end of the inward portion.

FIG. 2 is a partly broken away side view of the assembled fan case strut.

FIG. 3 is a cross-sectional view taken along the lines 3—3 of FIG. 2.

FIG. 4 is a cross-sectional view taken along the lines 4—4 of FIG. 2.

FIG. 5 is a view taken along the lines 5—5 of FIG. 2.

FIG. 6 is a partly broken away side view of an assembled alternate embodiment of the fan case strut of this invention.

FIG. 7 is a view taken along the lines 7—7 of FIG. 6.

DETAILED DISCLOSURE

Referring to FIG. 1a, the invention shown is a fan case strut 10 for joining together the engine core 16 and a radially outwardly disposed axial flow turbomachine fan case 18 at a plurality of circumferential locations. The fan case strut 10 is comprised of a radially inner strut portion 20 and a radially outer strut portion 40 which are joined together at a radially intermediate strut joint 14. The radially inner end 22 of the inner strut portion 20 is affixed to the engine core 16. Likewise, a radially outer end 42 of the outer strut portion 40 is affixed to the fan case 18. Each radially extreme connection is either fixed or releasably secured to its respective engine structure 16, 18 through known connection means.

As shown in FIG. 1b, the fan case strut joint 14 of the instant invention is releasably severable at a radially intermediate location of the strut 10. An axially extending tongue 26 disposed on the radially outer end 24 of the inner strut portion 20 engages with a corresponding axially extending groove 46 disposed in a radially inner end 44 of the outer strut portion 40 at two slidable contact surfaces intrinsic to a tongue and groove configuration, the resulting strut joint 14 extending transversely relative to the radially extending strut 10. The axially extending tongue 26 further has a lateral surface 28 defined by downstream diverging edges 32 (more clearly shown in FIG. 1c) which substantially radially correspond with the outer upstream periphery of the strut's streamlined cross-section. The tongue's receiving groove 46 has a corresponding profile which is peripherally disposed about the radially inner end 44 of the outer strut portion 40. Thus, the downstream diverging groove 52 of the outer strut portion 40 tapers towards the leading edges 35 and 55 of the strut portions 20, 40.

Now referring to FIG. 2, a partly broken away side view of the assembled strut joint 14 is shown, and a corresponding planar cross-sectional view of the radially outer end 24 of the inner strut portion 20 taken along the lines 3—3 of FIG. 2 is shown in FIG. 3. An axially extending, radially projecting contour 30, such as a ridge, disposed on the lateral surface 28 of the tongue 26 slidably cooperates with a corresponding furrow 50 disposed in the radially inner end 44 of the outer strut portion 40, shown in FIG. 4. Accordingly, this furrow 50 is symmetrically positioned between the downstream diverging contours 52 of the groove 46 and fully accommodates the contour 30 when the tongue 26 is fully engaged in the groove 46.

The present invention provides a strut joint engagement feature completely separate from a preliminary alignment feature. In particular, the contour 30 is slidably guided along and centered within the furrow 50 during initial assembly of the joint 14. The contour 30 is guided along an axial length of the furrow 50 which is shorter than the overall axial engagement length of the strut joint 14 by a distance equal to or greater than the tongue and groove's axial engagement length at the leading edge of the joint 14. Accordingly, the tongue 26 and groove 46 are initially engaged only after the contour 30 and furrow 50 have been fully engaged and any slidable contact between the contour 30 and furrow 50 ends prior to the tongue 26 and groove 46 engagement. The contour's aftmost shaped section is configured to accommodate complete nesting of the contour 30 within the furrow 50 prior to initial engagement of the tongue 26 within the groove 46. Complete nesting of the contour 30 within the furrow 50 establishes the proper orientation of the tongue 26 relative to the groove 46 prior to assembly of these elements 26, 46. Alternatively, the aftmost portion of the radially inward end 44 of the outer portion 40 may be configured to provide a stepped configuration wherein the contour 30 is floated within the furrow 50 after alignment of the corresponding joint ends but prior to tongue 26 and groove 46 engagement. This alignment feature thus enables the simultaneous initial alignment of, for example, the corresponding portions 20, 40 of the nine radial fan case struts used in one version of the Pratt & Whitney 4000 series turbofan engine, prior to final engagement of the tongues 26 and grooves 46 used therein.

Referring again to FIG. 1b, the tongue 26 and groove 46 each have an axially disposed downstream trailing edge 34, 54 respectively. Two radially extending flanges 36, 56 disposed on the tongue 26 and proximate to the groove 46, respectively, are each proximately located near a trailing edge 34 of the inner strut portion and a trailing edge 54 of the outer strut portion, respectively.

The radially extending flanges 36, 56 are substantially parallel to each other and are substantially perpendicular to the plane defined by the slidable strut joint connection of the tongue and groove 26, 46, as shown in FIG. 5. After the tongue 26 has been fully engaged with the groove 46, these flanges 36, 56 are releasably joined together with a bolted connection 59 passing through corresponding bolt holes 38, 58 disposed in each flange 36, 56 respectively. This bolted connection 38, 58, 59 thus secures the strut joint 14 against significant relative axial sliding motion between the radially intermediate ends 24, 44. Due to their location and configuration, the flanges are not significant load-bearing members and any loading which the fan case 18 is subjected to does not pass through the bolted flange connection 36, 56, 59. In addition to the above, the bolted connection 59 may be pretensioned or preloaded to correct for any minute wear in the strut joint 14.

The radially extending flanges 36, 56 may be disposed on a radially contiguous common edge such as the leading edge 35, 55, or the trailing edge 34, 54, of the fan case strut 10, but preferably only on the latter surfaces for aerodynamic efficiencies.

According to the present invention, the strut portions 20, 40 of the fan case strut 10 include a streamlined airfoil surface 12 which provides certain shaped airflow induced benefits to the turbomachine (not shown). The radially intermediate ends 24, 44 of each portion 20, 40, respectively, are substantially chordwisely oriented, causing the strut portions 20, 40 to mate at a common chord of the aerodynamically shaped strut.

Now referring to FIG. 6, a partly broken away side view of an assembled alternate embodiment of the present invention is shown. A pair of interlocked axially extending channels 60 each having a generally U-shaped cross-section disposed on the radially outer end 24 of the inner strut portion 20 and on the radially inner end 44 disposed on the outer strut portion 40 replace the interlocked tongue and groove 26, 46 of the previously described embodiments. A plurality of slidable contact surfaces 62 are disposed on the channels 60.

According to one embodiment, the channels 60 share a common, generally U-shaped, cross-sectional profile. This shared geometry offers precise control of various geometric parameters such as pinch and seating of the channels 60. More particularly, the engaged channel's three contact surfaces 62 slidably engage and simultaneously pinch the abutting surfaces 62 when the corresponding parallel surfaces 62 of the two channels 60 are fully slidably engaged. The radially extending flanges 36, 56 disposed proximate to the trailing edges 34, 54 of the strut portions 20, 40 are releasably secured together by the means previously described above when the channels 60 are fully engaged together, this bolted connection further shown in FIG. 7.

Further modifications and improvements of the invention herein disclosed will occur to those skilled in the respective arts and all such modifications and improvements are deemed to be within the scope of the invention as defined by the appended claims.

We claim:

1. In an axial flow turbomachine having an engine core annularly disposed about a longitudinal axis passing therethrough, a coaxial fan case disposed radially outwardly of the engine core, and a plurality of radially-extending load-bearing struts circumferentially disposed therebetween, each strut comprising:
   a radially inward portion and a radially outward portion, the portions having a substantially contiguous axially downstream trailing edge, wherein a radially inner end of the inward portion is affixed to the engine core, and wherein a radially outer end of the outward portion is affixed to the fan case,
   an axially extending tongue disposed on a radially outer end of the inward portion slidably engaged with a corresponding axially extending groove disposed on a radially inner end of the outward portion,
   a radially extending first flange disposed on the tongue proximate to the trailing edge of the inner portion, and
   a radially extending second flange disposed proximate to the trailing edge of the outward portion, and means for releasably securing said first and second flanges when the tongue and groove are fully engaged.

2. The strut of claim 1, wherein said radially extending flanges are substantially parallel to each other and substantially perpendicular to a plane defined by the slidable connection of the tongue and groove.

3. The strut of claim 1, further characterized by a streamlined surface disposed on the portions.

4. The strut of claim 3, wherein said portions are joined at a chord of the strut.

5. In an axial flow turbomachine having an engine core annularly disposed about a longitudinal axis passing therethrough, a fan case disposed radially outwardly of the engine core, and a plurality of radially-extending load-bearing struts circumferentially disposed therebetween, each strut comprising:
   a radially inward portion contiguous with a radially outward portion, the portions having a substantially contiguous axially downstream trailing edge, wherein a radially inner end of the inward portion is affixed to the engine core, and wherein a radially outer end of the outward portion is affixed to the fan case,
   a radially extending first flange disposed proximate to the trailing edge of the inner portion,
   a radially extending second flange disposed proximate to the trailing edge of the outward portion,
   an axially extending channel having a U-shaped cross-section disposed on a radially outer end of the inward portion slidably engaged with a corresponding axially extending channel having a U-shaped cross-section inversely disposed on a radially inner end of the outward portion, each channel having a plurality of contact surfaces disposed thereon, the plurality of contact surfaces disposed on each channel substantially slidably engaged, and
   means for releasably securing said flanges together when the channels are fully slidably engaged.

6. The strut of claim 5, wherein three contact surfaces are slidably engaged.

7. The strut of claim 5, further characterized by a radially disposed aerodynamically shaped planform disposed on the strut.

* * * * *